(12) United States Patent
Howard

(10) Patent No.: US 11,138,640 B2
(45) Date of Patent: Oct. 5, 2021

(54) ON-LINE ADVERTISING

(71) Applicant: Joshua Howard, Lexington, KY (US)

(72) Inventor: Joshua Howard, Lexington, KY (US)

(*) Notice: Subject to any disclaimer, the term of this patent is extended or adjusted under 35 U.S.C. 154(b) by 435 days.

(21) Appl. No.: 15/332,993

(22) Filed: Oct. 24, 2016

(65) Prior Publication Data
US 2017/0140442 A1 May 18, 2017

Related U.S. Application Data

(60) Provisional application No. 62/244,770, filed on Oct. 22, 2015.

(51) Int. Cl.
G06Q 30/02 (2012.01)
G06F 16/22 (2019.01)

(52) U.S. Cl.
CPC ......... *G06Q 30/0277* (2013.01); *G06F 16/22* (2019.01)

(58) Field of Classification Search
CPC .................................................. G06Q 30/0277
USPC ....................................................... 705/14.73
See application file for complete search history.

(56) References Cited

U.S. PATENT DOCUMENTS

| | | | |
|---|---|---|---|
| 2011/0231321 A1* | 9/2011 | Milne ................... | G06Q 30/00 705/80 |
| 2013/0018710 A1* | 1/2013 | Winslade ............... | G06Q 30/02 705/14.4 |
| 2013/0311339 A1* | 11/2013 | Jeremias ............ | G06Q 30/0601 705/27.1 |

* cited by examiner

*Primary Examiner* — Azam A Ansari
(74) *Attorney, Agent, or Firm* — York Law LLC; Olen L. York, III

(57) ABSTRACT

A method comprising providing a graphic user interface allowing one or more users to input user attributes including one or more buyer profile attributes allowing selection of one or more types of merchant buyers prefers to interact and one or more merchant profile attributes allowing selection of one or more types of buyer the one or more merchants prefers to interact. Parameters may be input in a free-form manner to replicate meta-data. Multiple user profiles may be created through an interoperable on-line system from the user profile attributes. Such profile attributes may be transmitted the one or more buyer attributes and the one or more merchant attributes into one or more databases for storage and retrieval. Users may be notified from one or more merchants when request parameters of one or more buyers is satisfied by one or more merchants. Offers may be rejected or accepted.

9 Claims, 13 Drawing Sheets

ON-LINE ADVERTISING

PRIOR APPLICATION

This application claims the benefit of U.S. Provisional Application No. 62/244,770, filed on Oct. 22, 2015, the disclosure of which is hereby incorporated by reference in its entirety.

FIELD OF THE INVENTION

This invention relates to computer-readable media, systems, and methods that provide on-line advertising between merchant and consumers.

BACKGROUND OF THE INVENTION

Applications for mobile devices are becoming increasingly popular to the average consumer through entertainment or by accomplishing relatively important tasks and a spectrum of other uses between the important and entertaining. Such applications, or "apps", are available for installation on a broad range of mobile devices that span the spectrum of commercially available technology, such as mobile terminals and small, low-power handheld devices, including handheld computers, enterprise digital assistants (EDAs), Tablet Personal Computers (Tablet PCs), notebooks, or mobile phones, including so-called smart-phones. Such applications are either pre-installed on mobile devices during manufacture or downloaded by customers from various mobile software distribution (digital distribution) platforms.

Alternatively, specified apps have a corresponding or associated web-page based alter ego so that authorized users can access the application through traditional web-page (URL—uniform resource locator) interfacing via a dedicated web-page. These alternatives accommodate situations where mobile network access is limited or compromised and personal computer (PC) access is readily available (or vice versa), and at least or until broadband and wi-fi web-connectivity becomes ubiquitous and uninhibited by geography and/or topography.

According to a published industry survey conducted by PricewaterhouseCoopers LLP, on-line advertising, encompassing all digital platforms, continues to grow across all industries. <http://www.iab.net/media/file/IAB_Internet_Advertising_Revenue_Report_FY_2012_rev.pdf> (accessed Aug. 26, 2014). The survey indicates that revenue from on-line advertising increased from $31.74 billion in 2011 to $36.57 billion in 2012. For the first six-months of 2013, ad-revenue totaled approximately $20.1 billion, a pace that would continue the expected upward trajectory of on-line ad revenue generation. The industries taking advantage of these revenue streams include retailers, telecommunication companies, financial service providers, computing products, travel, packaged goods, entertainment, media, and health care and product providers. As is clear, on-line advertising cuts a broad path across all competitive industries.

Most on-line advertising is accomplished through search and display techniques. One of the most popular and commonplace techniques is search engine optimization utilized by on-line search engines (e.g., Google, Yahoo!, Bing) that often relies on the interaction between the search engine, the user, and the web-site's structure and content. One example of a display technique in the on-line universe is banner ads that may be fixed (static) or rolling (revolving). Display advertising may be contextual to the general nature of the web-site visited, behavior according to the typical visitor profile, or a mix. Presently, search-based techniques and display-based techniques account for approximately two-thirds of all on-line generated advertising revenue.

Despite the large volume of revenue generated yearly by on-line search and display advertising methods, several problems persist with such on-line advertising techniques. One significant on-going problem is the legality and/or privacy concerns raised by certain techniques, including the use of tracking software and related digital devices that follow users while browsing on-line so that the software can create profiles and target advertising at designated web-pages and/or typical users. A related problem is the unsolicited nature of the data collection and advertising, which is mostly out of the control of the targeted user. Consumers are becoming more sensitive to advertising based on keyword appearances in sent or received e-mail and recent search engine queries, finding such advertising unwarranted and intrusive into their personal lives. Moreover, occasionally, the targeted advertising contains provocative or even offensive content that many consumers simply do not welcome.

Another problem is the on-going cost of an advertising campaign for an individual advertising party. In traditional print-media formats, most of the advertising costs existed on the front-end through the development of the visual and textual indicia to be used in print, with little to no change occurring once the campaign was launched. By comparison, in an on-line context, most of the costs are back-loaded and continuous as the advertiser and creative team continually modify the advertising in response to consumer reaction measured through various analytic techniques, programs, and/or specified metrics. Because of the scope of such campaigns, and the attempt to change the advertising in approximate real-time, the advertiser incurs greater and more prolonged costs, experiences significant inefficiencies with the continuous shift in visual and textual messaging, as well as tackling technological challenges through overriding or circumventing controls that try to prevent or inhibit certain forms of on-line advertising on the browsing-side. These problems represent significant issues where an advertising party and its advertising team attempt to tailor ads and messages for the average consumer that often have conflicting use and taste profiles.

Technologically, on-line advertising supports the majority of free content available via the world wide web, but as a consequence, tends to clutter individual web-pages and cause slow load times because of the graphic-intensive nature of these ads. Because so many of these on-line ads are video in nature, persistent problems with third-party services (e.g., Adobe Flash) crashing, requiring content re-loads, re-installation or updates of the third-party service, or restart of the entire system, consumers have become frustrated with the avalanche of graphic ads presented. Moreover, as touch-pads and touch-screens become more prominent, inadvertent mouse and/or cursor rolling or clicking that unintentionally launches advertising videos has become an annoying by-product of such technology.

Also at issue, without careful review of the proposed advertising campaign, an advertising party may unwittingly allow their brand to be featured on or in association with web-sites of questionable content, integrity, or products and/or services. Because many advertising agreements and campaigns are geared toward quantity placement for increased browser traffic, the advertising party may inadvertently allow their brand to appear in places that it would otherwise never consider or allow.

Several attempts have been made to address some or all of these issues. In particular, ad exchanges and real time bidding formats have emerged to address ill-targeted advertising techniques, latency, and related on-line advertising inefficiencies. For example, SpotXChange (www.spotxchange.com) is a type of real-time bidding exchange that presents its platform as akin to the stock market, allowing an advertising party to quickly identify and bid on ad placement opportunities in virtual real-time to immediately supply a perceived advertising need. However, such exchanges and real-time bidding platforms continue to rely upon user profiles built from user-tracking (e.g., via cookies) methods, which raise some of the same issues previously raised, in addition to the inherent technological limitations of such user-tracking methods that are not compatible to a mobile web-browsing environment. Accordingly, it is desirable to have a service and platform that overcomes the problems previously identified.

SUMMARY

In one embodiment, one or more non-transitory computer-readable media having computer-executable instructions embodied thereon that, when executed by a computing device having a processor and memory, perform a method comprising providing, by a computing device, a graphic user interface; communicating, by the computing device from a first source to a second source, input parameters for a solicitation; and communicating, by a computing device from the second source to the first course, the solicitation.

One or more non-transitory computer-readable media having computer-executable instructions embodied thereon that, when executed by a computing device having a processor and memory, perform a method comprising proving a graphic user interface allowing one or more users to input user attributes; inputting of one or more buyer profile attributes; inputting of one or more merchant profile attributes; creating multiple user profiles through an interoperable on-line system receiving inputs from the one or more buyer profile attributes and from the one or more merchant profile attributes; transmitting the one or more buyer attributes and the one or more merchant attributes into one or more databases for storage and retrieval; notifying one or more merchants when request parameters of one or more buyers is satisfied by one or more merchants; proposing or rejecting one or more offers to interact with one or more buyers by one or more merchants; and accepting or rejecting terms proposed by one or more merchants by one or more buyers based on one or more buyers responding to the terms proposed.

One or more non-transitory computer-readable media having computer-executable instructions embodied thereon that, when executed by a computing device having a processor and memory, perform a method comprising providing a graphic user interface allowing one or more users to input user attributes; inputting of one or more buyer profile attributes; selecting one or more types of merchant the one or more buyers prefers to interact; inputting of one or more merchant profile attributes; selecting one or more types of buyer the one or more merchants prefers to interact; inputting parameters in a free-form manner to replicate metadata; creating multiple user profiles through an interoperable on-line system receiving inputs from the one or more buyer profile attributes and from the one or more merchant profile attributes; transmitting the one or more buyer attributes and the one or more merchant attributes into one or more databases for storage and retrieval; notifying one or more merchants when request parameters of one or more buyers is satisfied by one or more merchants; proposing or rejecting one or more offers to interact with one or more buyers by one or more merchants; and accepting or rejecting terms proposed by one or more merchants by one or more buyers based on one or more buyers responding to the terms proposed.

In additional embodiments, the method further comprises storing user statistics on one or more databases, wherein one or more databases comprise at least one buyer database, and/or wherein one or more databases comprise at least one merchant database. In an additional embodiment, the method further comprises tailoring subsequent solicitations to user based on analysis of stored statistics.

In additional embodiments, further comprising selecting a group fund option, wherein the method further specifies the one or more individuals to be included in a contributing pool and the one or more individuals to be included in a receiving pool, and/or further specifies a total limit on the contributing pool and an individual limit within the contributing pool.

DESCRIPTION OF THE EMBODIMENT(S)

Figure 1:
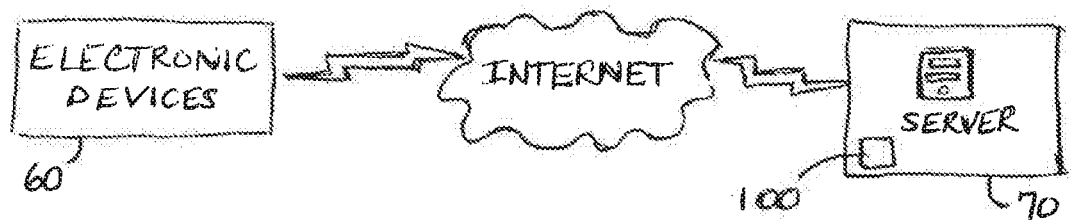
FIG. 1 generally depicts one or more electronic devices operatively connected to one or more servers through an Internet connection.

It will be readily understood that the components and elements of the invention, as generally described and illustrated in the figures herein, may be arranged and designed in a wide variety of different configurations. Thus, the following detailed description of the embodiments as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

A plurality of parties, such as consumers and sellers, and may be interactively-linked to a server via the Internet to allow interaction between one or more parties. These interactions may be performed by a variety of devices via executable program instruction(s) included in one or more memory mediums to facilitate transfer or exchange of information between interested parties. One such device may generally include a mobile computing device, such as a portable computer (e.g., laptops, notebooks, tablets, and/or notepads), a wearable computer (e.g., watches, wrist-wearable computers, and/or head-mounted display), and/or a mobile phone (e.g., cell phone, smart phone, and/or phone pad). Other such devices generally include personal computing devices, such as a desktop personal computer. The parties may be categorized or characterized as sources of information, including a source (S1) for communicating information or parameters for one or more commercial solicitations and a source (S2) for communicating one or more solicitations in response to the parameters.

As used herein, memory media (or medium if used in singular) includes a variety of storage media types, such as installation media (e.g., computer system memory, random access memory such as DRAM, DDR RAM, SRAM, EDO RAM, CD-ROM, floppy disks, flash drives, or tape), or non-volatile memory such as magnetic media (e.g., hard drive disks or optical storage). The memory medium may be located in a first device exclusively, or in a combination of devices electronically coupled via an Internet connection. Thus, the term "memory medium" may include two or more types of memory media types that may reside in different locations, including in different devices over a network or combination of networks.

As used herein, a commercial solicitation(s) is an invitation or request sent from one party to another party providing the opportunity to accept, reject, or counter-propose to an offer (including advertisements) to sell, transfer, lease, or rent an item, article, or other tangible product and/or a service.

As used herein, a product or service is an item for sale by a seller having certain characteristics that may vary depending on the unique product or service category. A product may be defined by its appearance, dimensions, function, and/or other appropriate unique characteristics. A service may be defined by the type of activity, the requirements of the service, and/or other appropriate unique characteristics.

As used herein, an item may be a tangible or intangible product or service, or a collection of tangible or intangible products and/or services.

Figure 2:
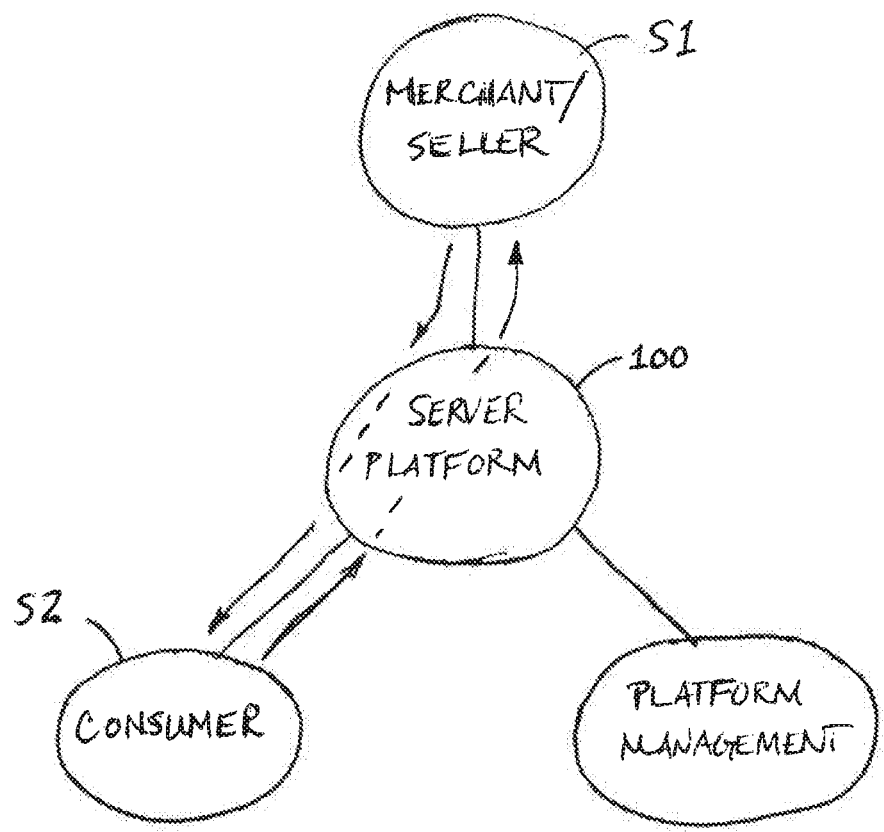
FIG. 2 generally depicts the interaction between seller and potential buyer through a server platform as influenced or controlled by a platform management application or sub-application.

In accordance with FIG. 1, an Internet connection 50 electronically linking or coupling one or more electronic devices 60 with one or more servers 70 is depicted, the devices 60 controlled by one or more sources of information, generally denoted by reference characters S1 and S2. A web application platform 100 is depicted as residing on or within one or more servers 70. Consistent with the depiction in FIG. 2, the platform 100 facilitates relationship development between one or more merchants (S1) and one or more consumers (S2) by enabling targeted advertising from one party to one or more other parties (information exchange indicated by directional arrows). In this manner, the platform 100 envisions and may be described as enabling bilateral entry of two sets of user groups, merchants and consumers, all of which is managed through a platform management protocol M integral to the platform 100. Interested merchants and consumers may utilize the platform 100 to initiate business relationship development opportunities in a variety of ways.

In general, a web application platform and system 100 will require all users to register with the service by filling-out a form for the mobile and/or web-based application before authorized use of the application system and method will be permitted. Creating a new user profile may be effectuated through multiple means, including through the use of existing social media profiles (e.g., Facebook, LinkedIn, Twitter), e-mail platforms, or other interoperable on-line systems.

Figure 3:
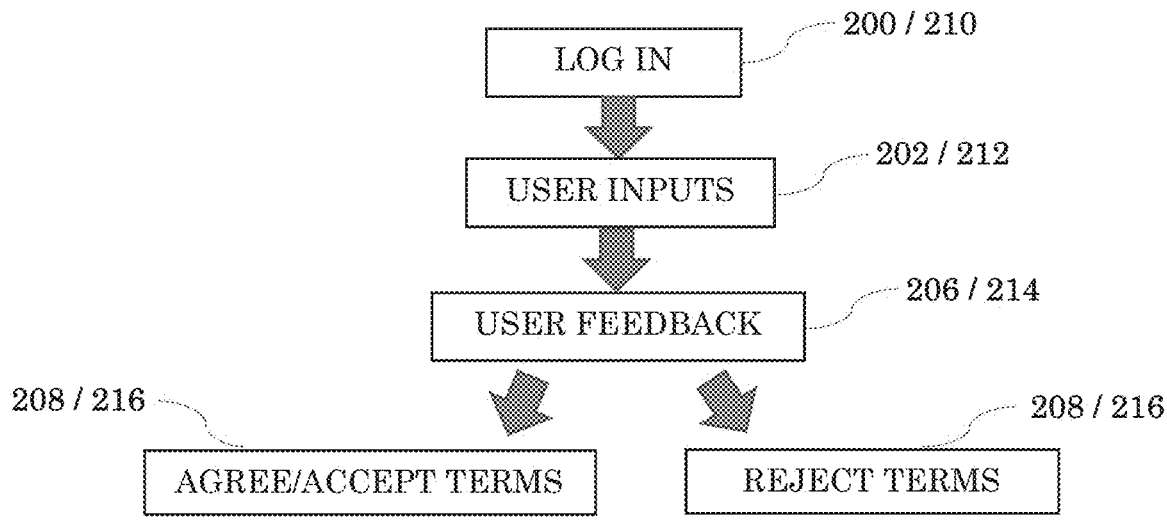
FIG. 3 generally represents one method of a potential buyer's management and control of the solicitations to be received.

Upon proper log-in authorization, denoted by steps 200 (FIG. 4) and 210 (FIG. 5) in FIG. 3, the authorized user may generally input certain parameters, data, and information as desired, otherwise understood to be user profile attributes, and further understood to be buyer (user-type) profile attributes and seller (user-type) profile attributes. The (buyer and/or merchant) user may select the type of merchant/seller the user is or that the user wishes to interact, and may select a specific merchant/seller if so desired. The user may also select specific categories and characteristics. The user, generally envisioned as the merchant/seller, may specify the deadline for response, any budgetary inputs, keywords, and any other specific notes, parameters, or characters desired. All information input and submitted will be transmitted through a custom REST API to a global remote database, or multiple databases if necessary, for storage and retrieval. Any request parameters satisfied by a potential buyer may result in a notification message to the seller. After the user inputs and feedback are communicated, the potential consumer may either accept or reject the proposed terms 208/216.

Figure 4:
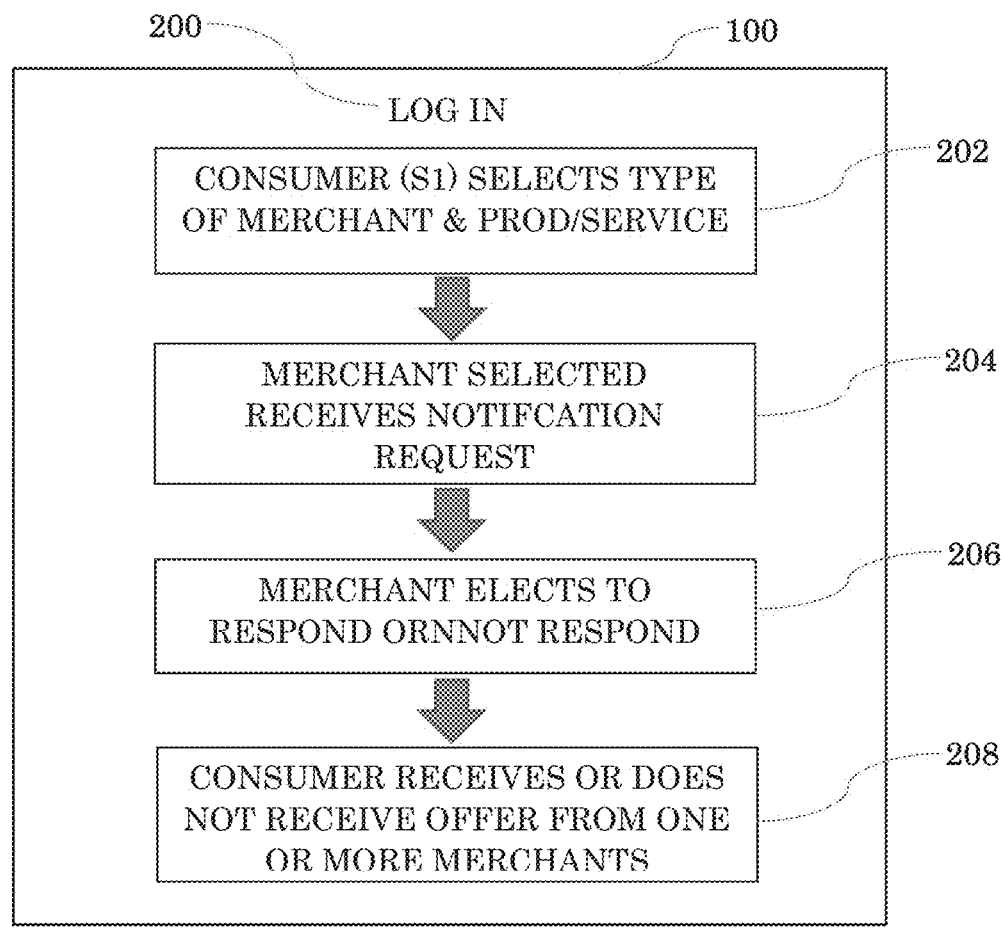
FIG. 4 generally represents one form of interaction between buyer(s) and seller, and FIG. 5 generally represents another form of interaction between buyer(s) and seller.

For example, consistent with the schematic of FIG. 4, a consumer S1 may initiate a request for a product or service from one or more merchants S2. In such an embodiment, the consumer S1 generally selects the type of merchant and the product(s) and/or service(s) 202. The merchant(s) S2 identified from the type selected list receive notification request 204 indicating that a potential consumer S1 is interested in purchasing product(s)/service(s). Thereafter, the merchant(s) S2 may elect to respond or not respond to the consumer S1 request 206. If the merchant(s) S2 elect to respond, the consumer S1 will receive one or more notifications or offers from merchant(s) S2, and if no offer is forthcoming, then no notification or offer is received 208.

Figure 5:
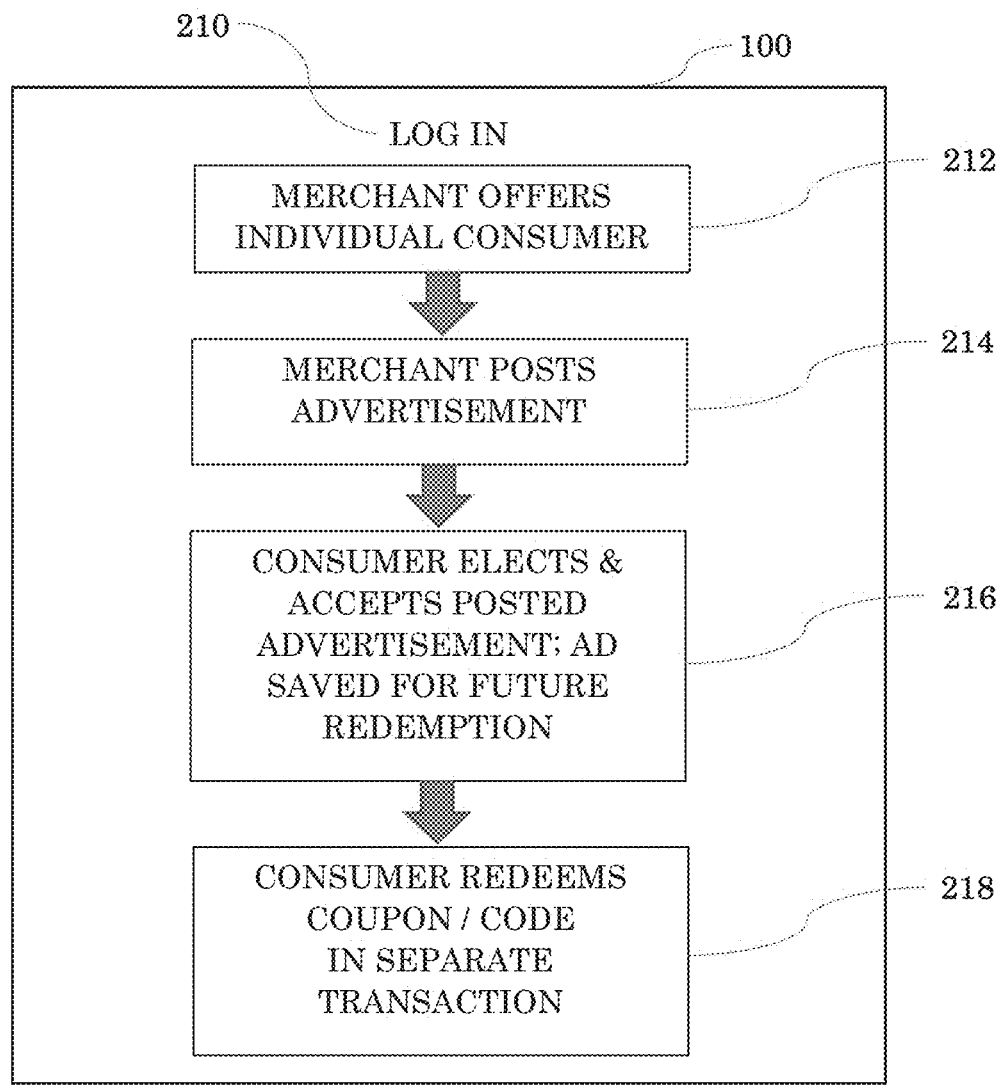

Alternatively, consistent with the schematic of FIG. 5, a merchant S1 may initiate an offer for a product or service for sale to the universe of subscribing consumers S2. A merchant S1 may offer an individual 212. The merchant S1 may post an advertisement or offer for a product or service 214. A consumer S2 elects the posted advertisement or offer, saving or purchasing the coupon, code, or other indicia of the offer for redemption 216. Thereafter, the consumer S2 redeems the coupon/voucher or code with the appropriate merchant 218. These general examples will be amplified herein. Although bilateral entry is envisioned, as is apparent, one of the users initiates a proposed business relationship by offering (by a merchant) or requesting an offer (by a consumer) to transact a sale of a good(s) and/or service(s), thereby facilitating a (potential) back-and-forth negotiation between sources S1 and S2.

Figure 6:
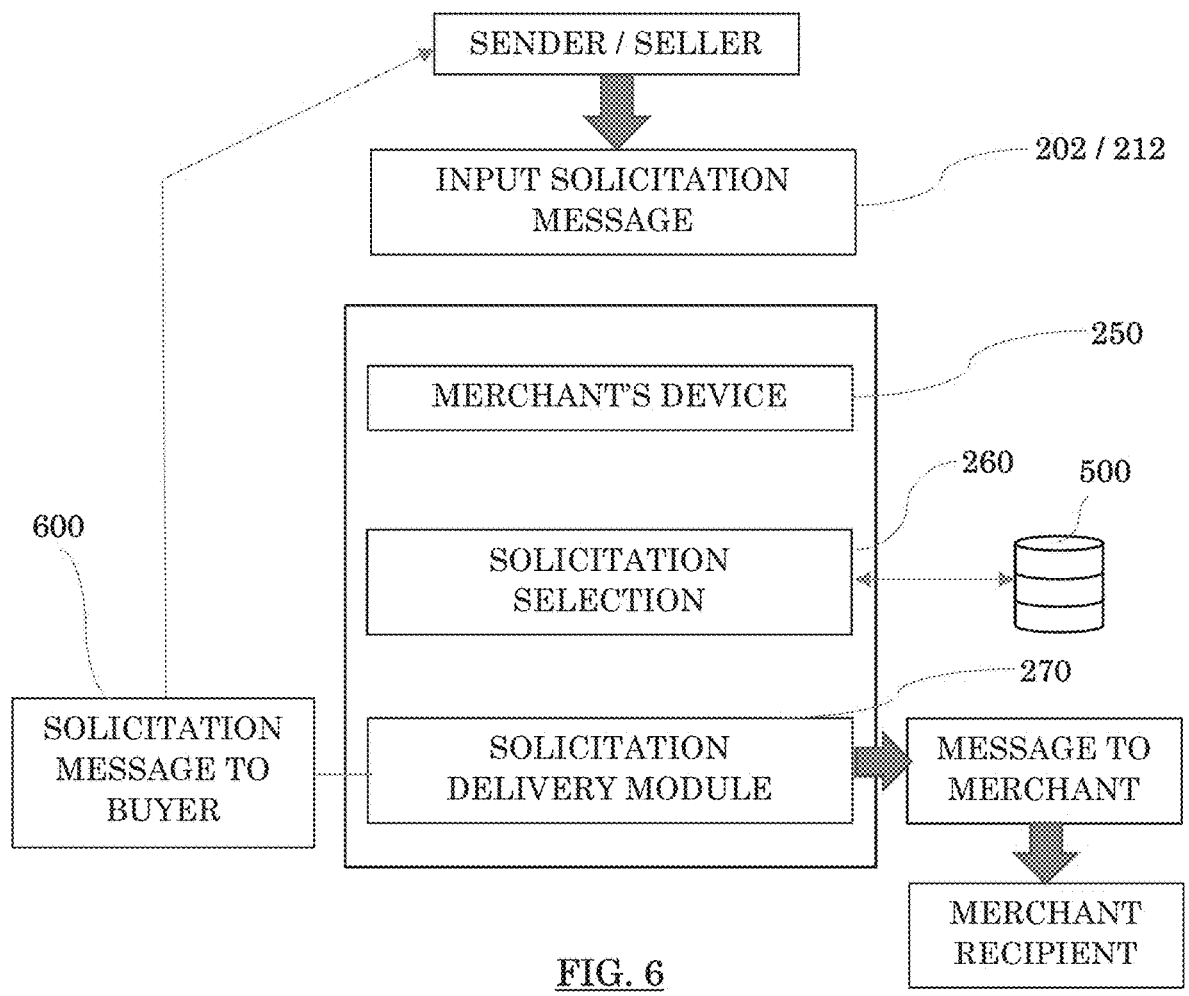
FIG. 6 generally represents an interaction between buyer(s) and seller including the various forms of notification that may be utilized.

Building upon that described and discussed in accordance with FIG. 4 and FIG. 5, the steps of FIG. 6 depict the relay of information between the sender and recipient. The sender 302 may represent merchant/seller or consumer. The sender 302 provides information input via a message that initiates a solicitation to the other party, generally corresponding to steps 202 (FIG. 4) and 212 (FIG. 5). The input generates a message and solicitation that is communicated to the merchant/seller's device 250. Solicitation selection 260 is performed in communication and coordination with the one or more databases 500 external to the system. One or more solicitation delivery modules 270 may be provided to deliver messages, solicitations/offers, and/or other information between the merchant and buyer.

The merchant/seller may view the buyer's request using either the merchant/seller mobile application (on a mobile device) or desktop website (for stationary computing). The mobile application and website are powered by the server(s) that host the remote database(s). A merchant/seller may choose to respond to the request or not, with such a selection generating an update to the remote database(s) (e.g., 500). A merchant/seller's response to the buyer is in the form of a unique solicitation (in the form of an advertisement or offer) sent to the buyer, and the buyer is notified through push-notification messaging (FIG. 6—600). The buyer may then save purchase or redeem the merchant/seller's solicitation. The buyer may save such a solicitation in the form of a bar-coded coupon, or other coupon appropriately formatted for quick and easy use.

It is envisioned that the mobile and web-based application platform will store vital statistics and allow merchant/seller and/or buyer to retrieve, sort, and analyze selling and/or purchasing decisions. Such analytic history will allow all users to closely monitor, examine, and modify selling and/or purchasing decisions based on price, savings, quality, and other parameters stored in the database(s). Based on the data and information, a merchant may be able to advantageously create tailored solicitations for the subscribing consumer base to consider, including offers on products and/or services that may not be available to the general public or may be severely restricted by inventory and/or time sensitivities.

The web application platform 100 includes a graphic user interface for all parties to input parameters, data, and information and to facilitate communication between potentially transacting parties. The parties or sources (S1, S2) of such commercial solicitations may comprise a variety of individuals, plurality of individuals, groups, partnerships, corporations, and other legally permissible affiliations of persons. In one example, a first source (S1) may comprise a seller of product or service, and the second source (S2) may comprise a potential consumer or buyer of such product or service. Via an Internet connection and coupled Internet connectivity through one or more servers, the sources (S1, S2) may interact by the exchange of information, and thereby allow the sources (S1, S2) to textually agree or disagree to transact the sale or purchase of a product and/or service (to be consummated through a separate on-line or offline exchange).

In one example, a seller of a product or service, or of multiple products and/or services, may be the first source (S1), may input information, including one or more features and/or characteristics connected to the product and/or service that may be used by other parties to identify potential products and/or services available for purchase via the graphic user interface. The graphic user interface allows the first source (S1) seller to select from a variety of product and service listings and define the product or service by as many or few characteristics as desired. Optionally, the first source (S1) seller may be able to input other characteristics or parameters in a free form manner to replicate meta-data or the like, increasing the flexibility of the application platform and graphic user interface provided.

It is envisioned that a database will store information about the sellers, the products and/or services, and the buyers. It is further envisioned that separate databases for the sellers and the buyers will be maintained, and the associated products and/or services to be exchanged by the parties. Such information input by one or more parties, to be stored and retained by the database(s), may include color, dimension, location, seller or buyer name, seller or buyer address and contact information, manufacture name, model number, quantity available, tracking capabilities, buyer and/or seller recommendation(s), and the like. Such inputs may be used as filters for listing and/or finding products and/or services.

A deal can be finalized and completion of the transaction can be arranged for on-line (separate from the web application platform) or off-line finalization. For example, a first source (S1) buyer may determine that s/he will want to dine in a particular area and among a personalized list of restaurants at certain date and time window. The first source (S1) buyer may input the information, including relevant date, time-window, and related accommodations or other desires, such as coat-checking and/or valet parking options, and transmit such a solicitation through the application platform and server(s) for consideration.

One or more second source (S2) seller(s) may receive such a solicitation and consider the solicitation in light of availability of reservation(s) for that date and time, and any related accommodations or other requests transmitted by the first source (S1) buyer. The second source (S2) seller may be able to satisfy all, some, or but one of the proposed terms provided by the first source (S1) buyer, and may communicate the proposed terms through the application platform and server(s). In this manner, the second source (S2) seller, in the form of a restaurant manager or other authorized user, may be able to tailor the proposed dining experience and accommodations in a manner not typically available to standard dining reservation requests made by phone. And, this facilitated interaction allows the second source (S2) seller the flexibility to reduce certain fees or charges, or provide food, beverage, and/or services above that typically paid by a standard diner, thereby accommodating windows of time that are not filled to reservation capacity or attracting new customers. In the event that the restaurant is reserved to capacity during the desired time-windows, the authorized restaurant user can simply decline the transmitted solicitation, or transmit a counter-proposal for a different time-window or other alternative(s) that may be accommodated by the restaurant.

In another example, the first source (S1) buyer may be attempting to purchase a product or tangible good (e.g., golf club), and provides the relevant information to the second source (S2) seller via the application platform and server(s). The second source (S2) seller may be able to tailor the corresponding response to first source (S1) buyer to encourage an agreement to purchase a golf club, multiple golf clubs, a set of clubs, and/or golf accessories at a discounted aggregate price. Through this flexibility, the second source (S2) seller has the ability to leave a favorable impression with the first source (S1) buyer, move merchandise that is difficult to move or becoming stale, and create a word-of-mouth benefit that may attract friends and colleagues of the first source (S1) buyer.

In another example, a civic arena or auditorium (second source (S2) seller) may be able to push less desirable concert or event tickets based on the information input of a would-be ticket purchaser (first source (S1) buyer), especially a buyer interested in concert or event ticket prices at or below a certain threshold in combination with a particular type of event.

Regardless of the origination of the solicitation, either source (S1, S2) may hold the solicitation open for a predetermined period of time, either to a specified individual target or to an unspecified group comprising potential individual targets. Optionally, other parameters may be set, including expiration of a solicitation based on quantified number of accepted solicitations, undisclosed price thresholds, and the like.

The web application platform 100 system and method receives a solicitation from the respective source(s)(S1) and communicates the solicitation to one or more parties or sources (S2) by a variety of means, including by external or internal e-mail inboxes, instant messaging, text messaging, SMS messaging, and other similar notification processes. It is envisioned that these notification messages may be performed through push-notification whereby a response to an outstanding request, message, or solicitation will generate and transmit a message communicating such to the targeted recipient for further action. Alternatively, it is envisioned that the notification feature may be set to not only receive messages via text and/or push notification of email messages, but also allows the user to select, include, exclude, and/or opt-out of receiving messages from multiple and various sources, as well as identifying specific windows of time to receive and/or not-receive such messages and/or information. Thus, it is believed that a feature of the system includes identifying specified times to include or exclude receipt of messages, and/or include or exclude receipt of messages from specified sources or senders.

Figure 7:
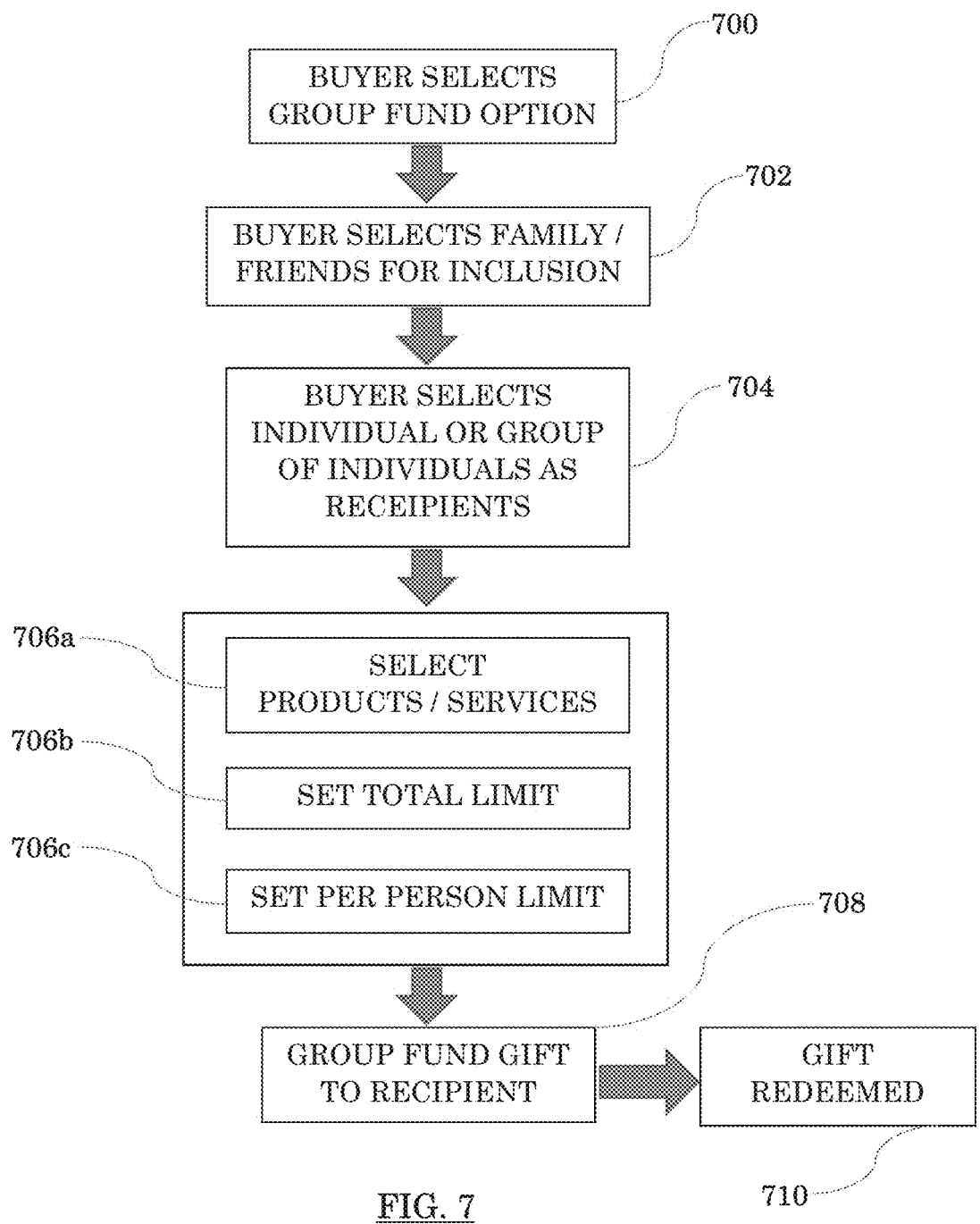
FIG. 7 generally represents a group fund option characteristic of the application method.

Another feature of the platform 100 includes the option of providing a group fund or pool. In accordance with the schematic depicted in FIG. 7, a buyer or user selects the group fund option 700. The buyer selects the family and/or friends for inclusion in the contributing pool 702, and also selects the individual or group of individuals to receive the group fund gift 704. The order of selection between 702 and 704 is not critical. Thereafter, the user selects the product(s) and/or service(s) to be purchased 706a, sets the total limit on the funding pool 706b, and sets a per person limit for the respective contributions 706c. Once the group fund reaches the appropriate limit to secure the product(s) and/or service(s), the group fund gift is sent to the recipient 708, which may take a variety of forms, including coupon, code, indicia, and other textual or visual messaging schemes. Thereafter, the recipient may redeem the gift in a separate transaction 710.

Figure 8A:
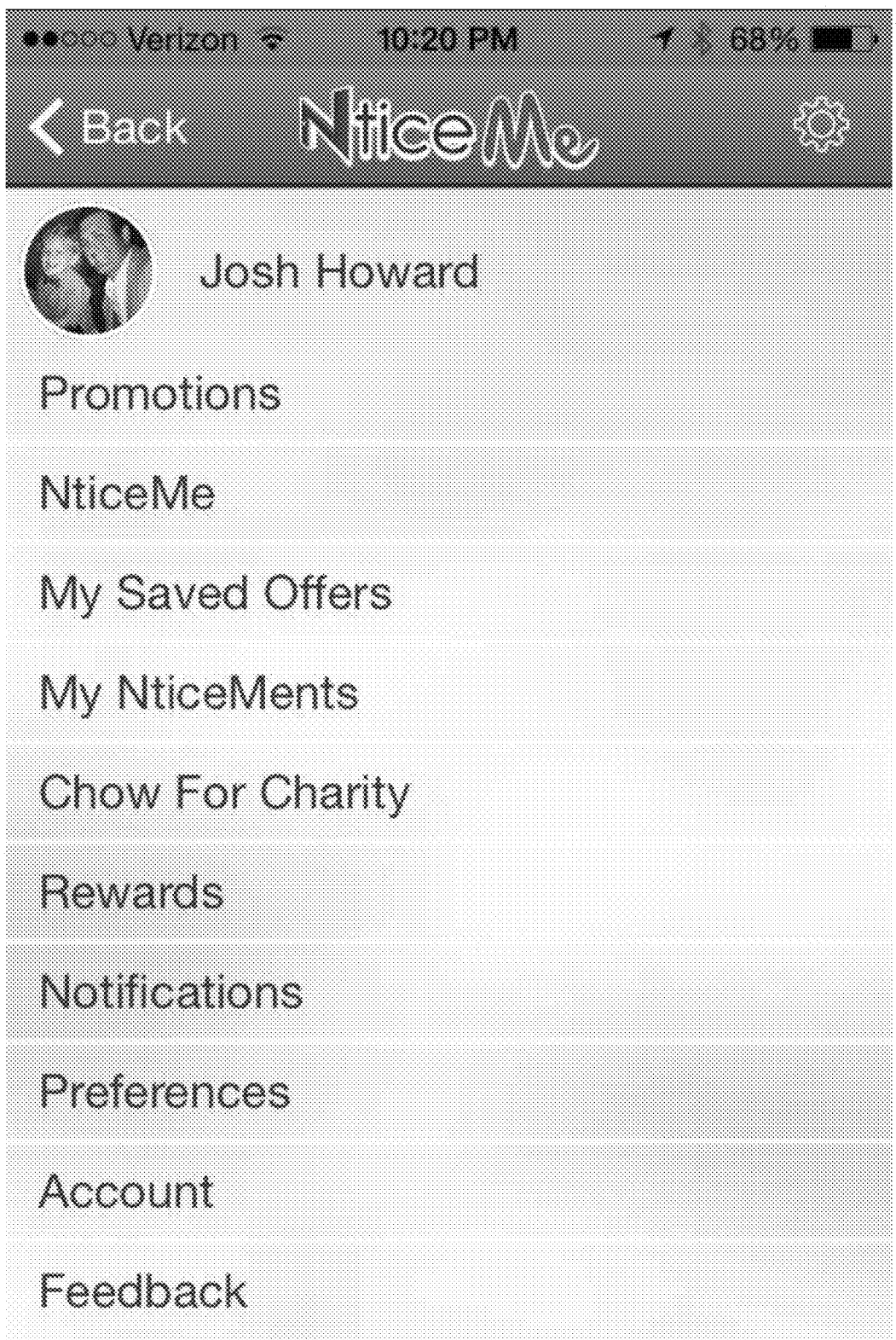
FIG. 8a-FIG. 8g are screen-capture images of the application method described herein.
Figure 8B:
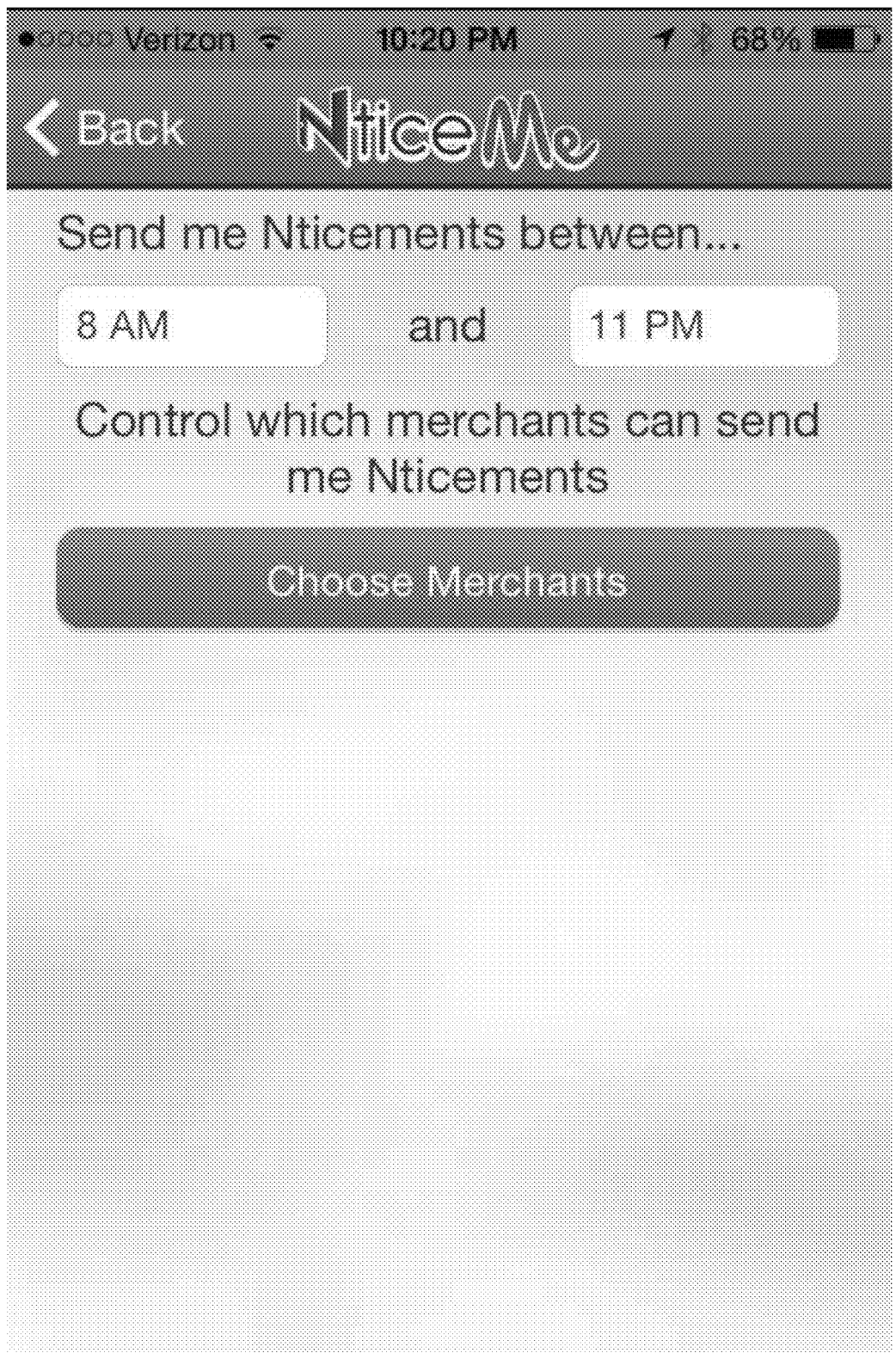
Figure 8C:
Figure 8D:
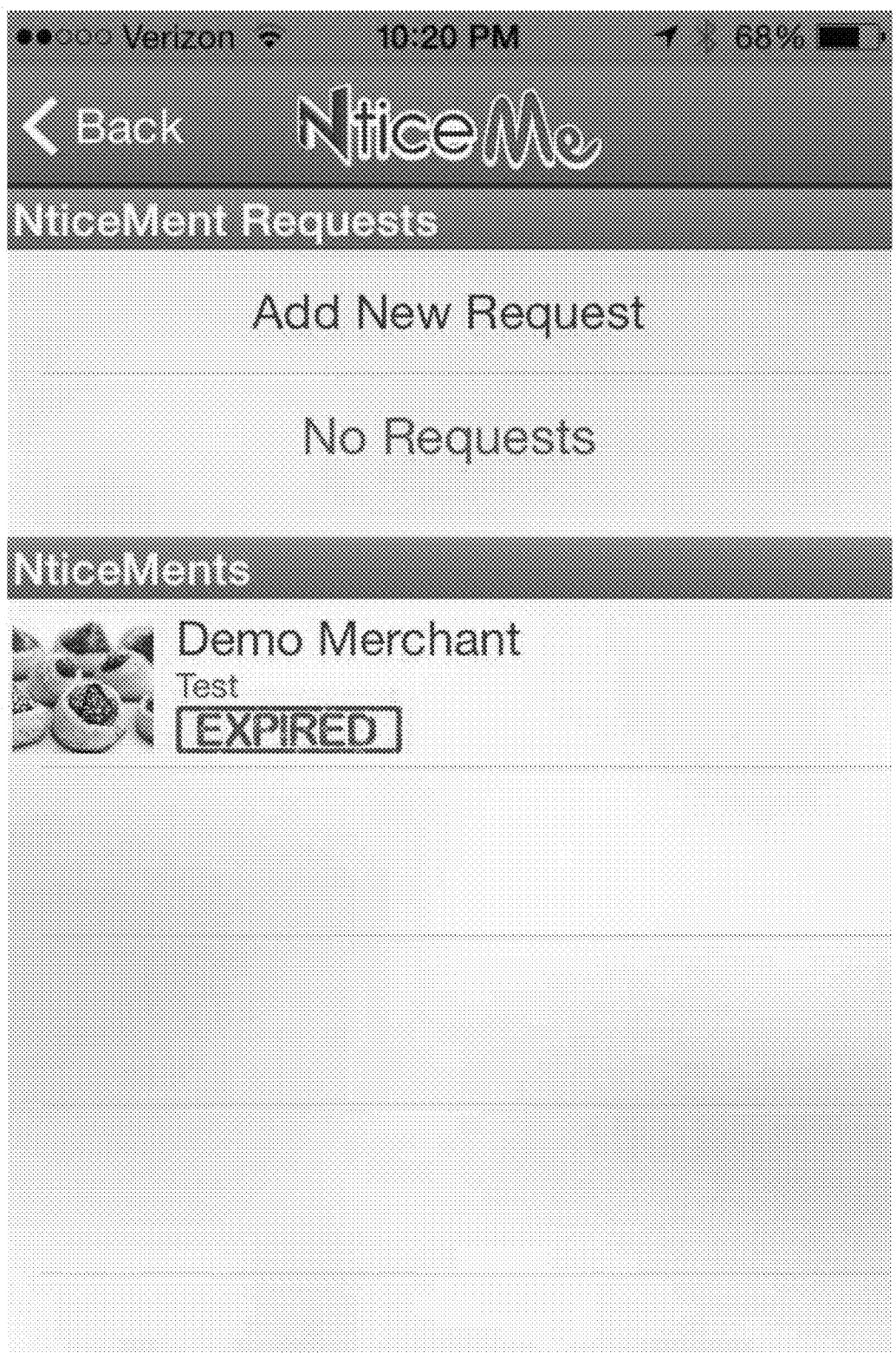
Figure 8E:
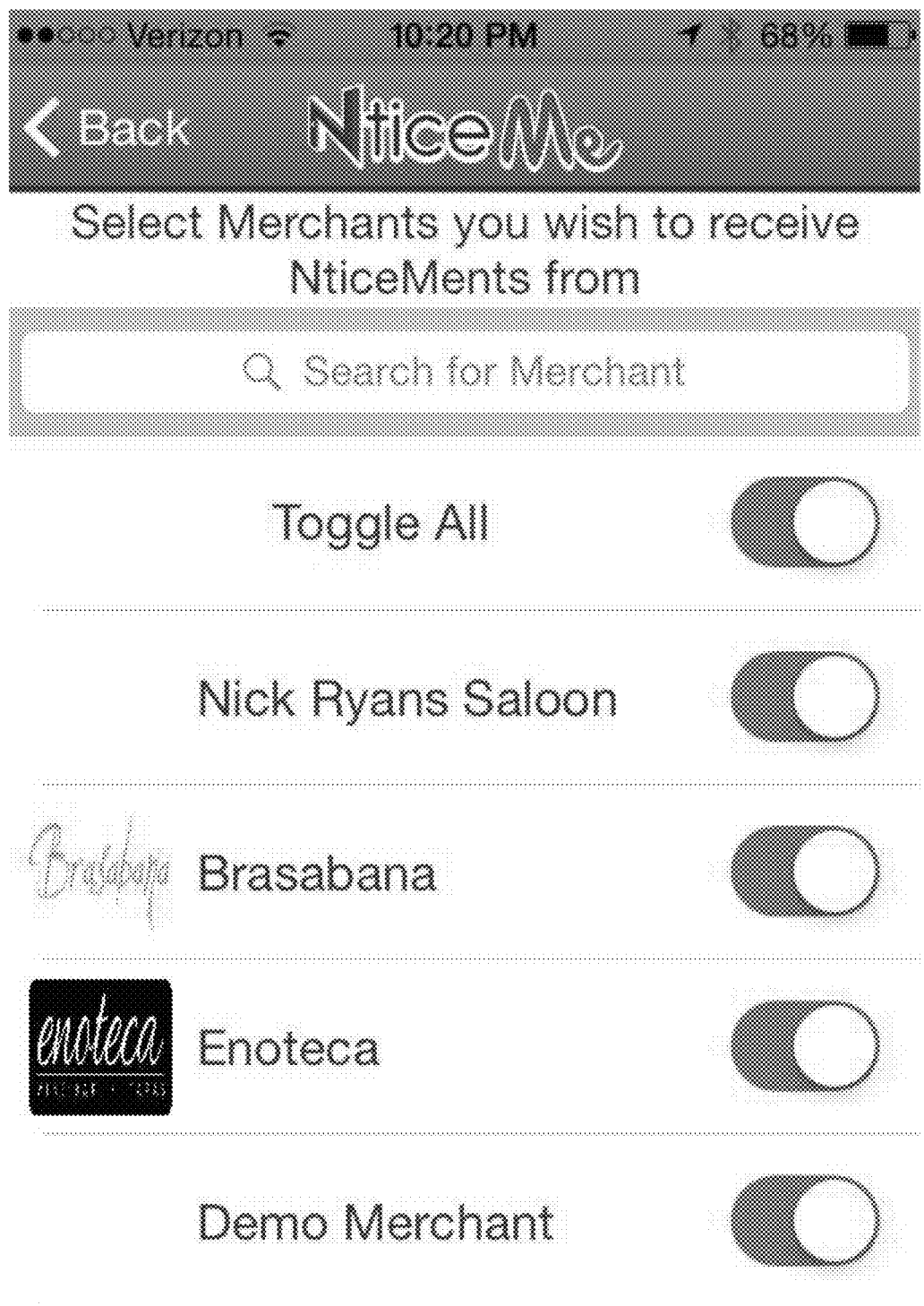
Figure 8F:
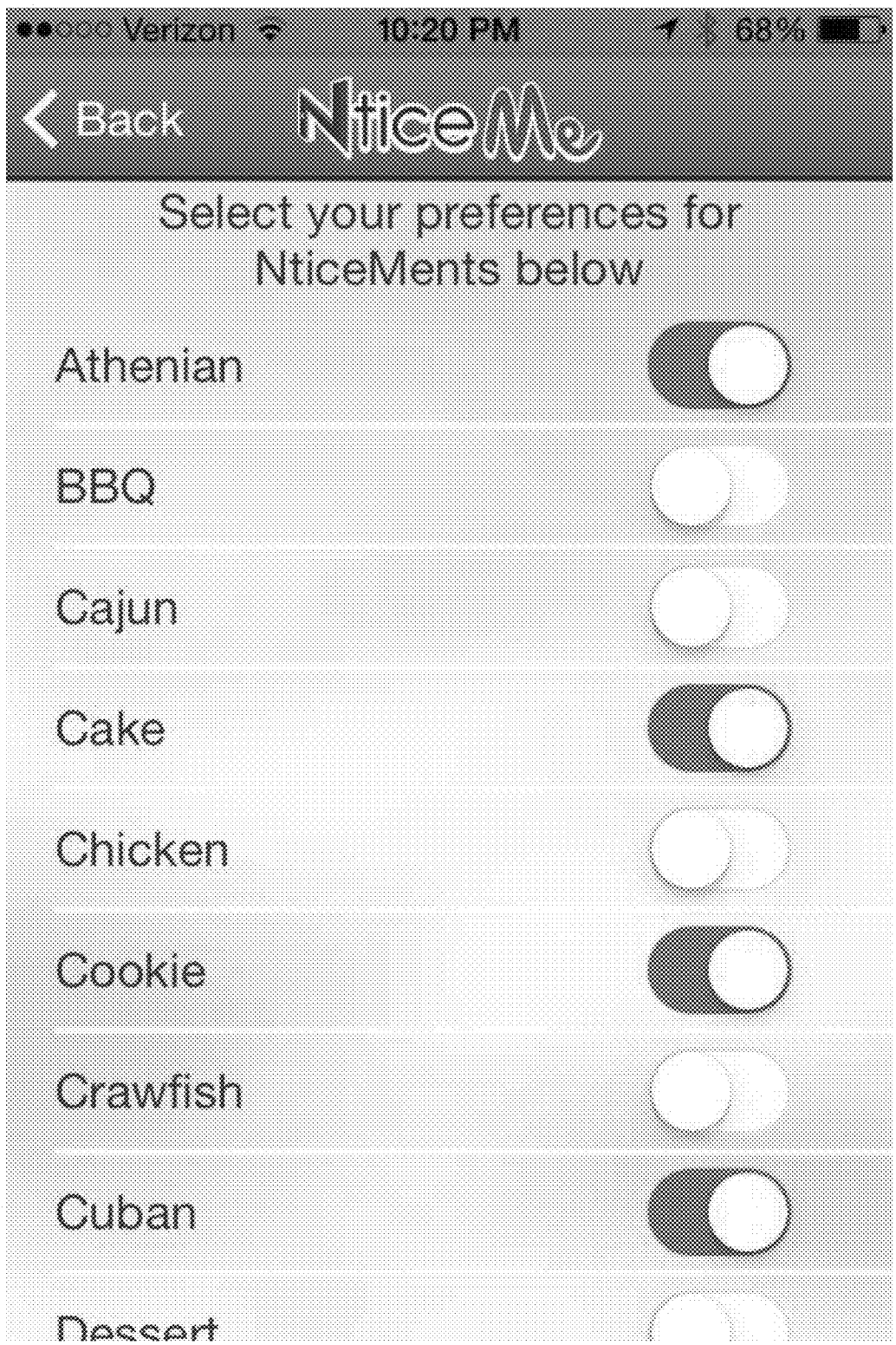
Figure 8G:
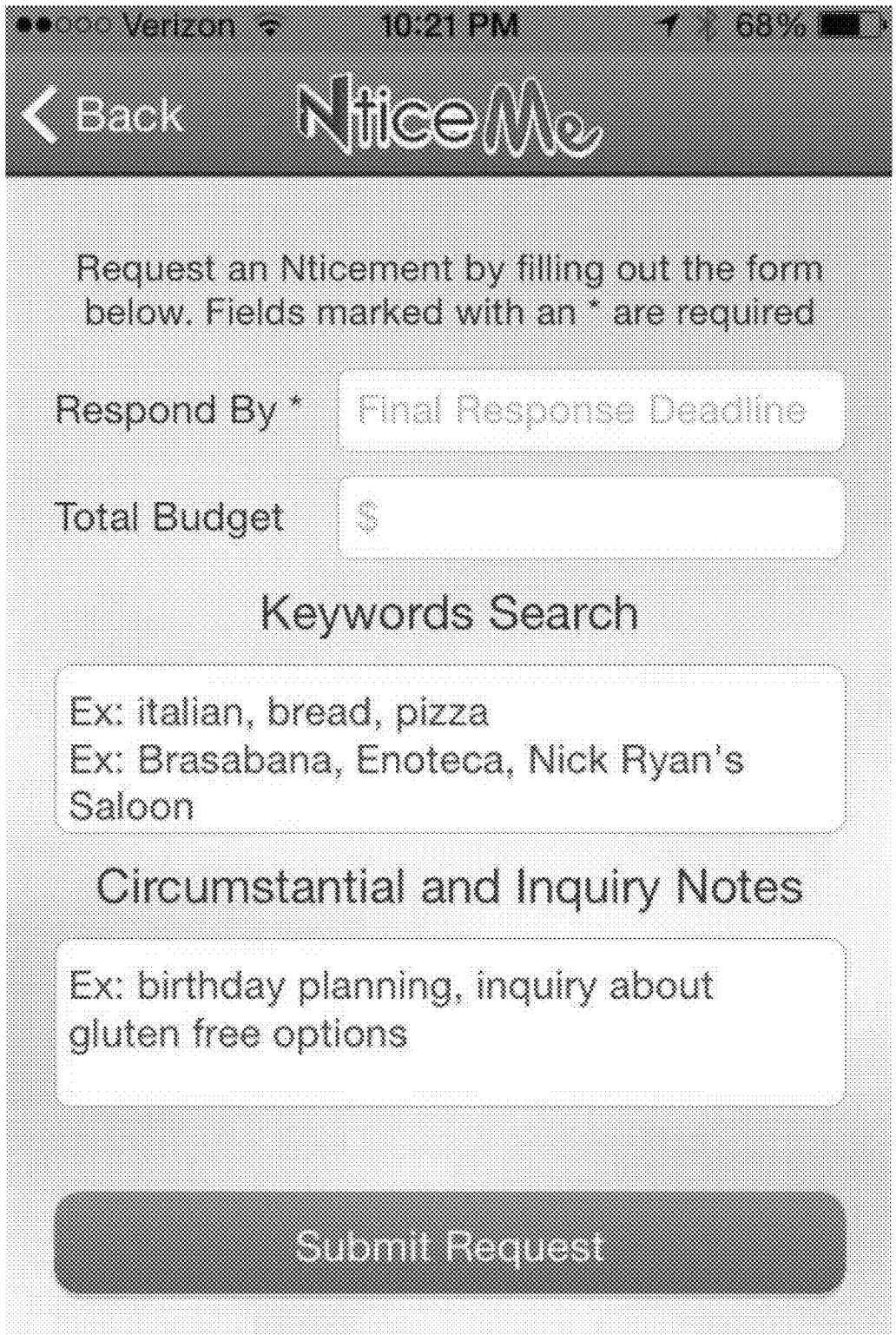

FIGS. 8a-8g are screen-capture images representing various aspects and characteristics of the application method described herein. In particular, FIGS. 8a-8g represent one of many potential user interface forms or formats that may be utilized to facilitate one or more transactions between the users within the application network. For example, FIG. 8a represents a home preferences page for each user logged-in, allowing for a variety of selections, including the multiple promotions offered from the network, preferences, saved items, and the like. Of the many user preference selection(s) available, FIG. 8b represents the user's ability to control the time window (if desired) of when s/he receives a notification regarding the solicitation parameters selected by the user. FIG. 8c represents a selection screen interface that indicates which merchant(s) offer various perks to the buyer(s). In this example, a list indicating the merchant(s), bar-code information, points, and rewards of a particular user may be aggregating. In this way, the user may be reminded of which merchant(s) s/he has rewards available or for which rewards are desired for collection at that time. FIGS. 8d and 8e represents an interface indicating if, how many, and by identification which merchant(s) the buyer(s) may have notification requests. In addition, the ability to add or remove merchant(s) from the notification request list is available. FIG. 8f represents one of many selection options customizable according to the consumer's preference. In FIG. 8f, the interface indicates that a restaurant is selected. The application method requests entry of a style or type of food preference, thereby matching any available merchant offers to the user's preference. FIG. 8g represents one of the selection options customizable by several categories. For example, a user may enter a deadline or expiration connected with the notifications. The user may separately set a budget limit for the type of solicitation s/he wishes to receive. The user may also use keyword entry(ies) to expand or limit the selections offered. In this example, the user may enter as few or as many keywords into the database. Upon completion, the application method will search for merchants and offers that match the keyword entries provided. Moreover, the user may enter additional notes and reminders for future reference and for assistance in setting future offers and/or tweaking such offers.

The embodiments can be implemented in digital electronic circuitry, or in computer hardware, firmware, software, or in combinations of these elements. The invention can be implemented as a computer program product, for example, in a machine-readable storage device, for execution by, or to control the operation of, data processing apparatus, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method operations of the embodiment of the invention can be performed by one or more programmable processors executing a computer program to perform functions of the invention by operating on input data and generating output. Method operations can also be performed by, and apparatus of the invention can be implemented as, special purpose logic circuitry, for example, an FPGA (field programmable gate array) or an ASIC (application-specific integrated circuit). Moreover, logic circuits and/or circuitry may include one or more combination of devices such as multiplexers, registers, arithmetic logic units, computer memory, and/or microprocessors, and in combination may possess a plurality (or even a large plurality) of logic gates through which the disclosed methods, processes, and/or operations may occur.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in special purpose logic circuitry.

Figure 9:
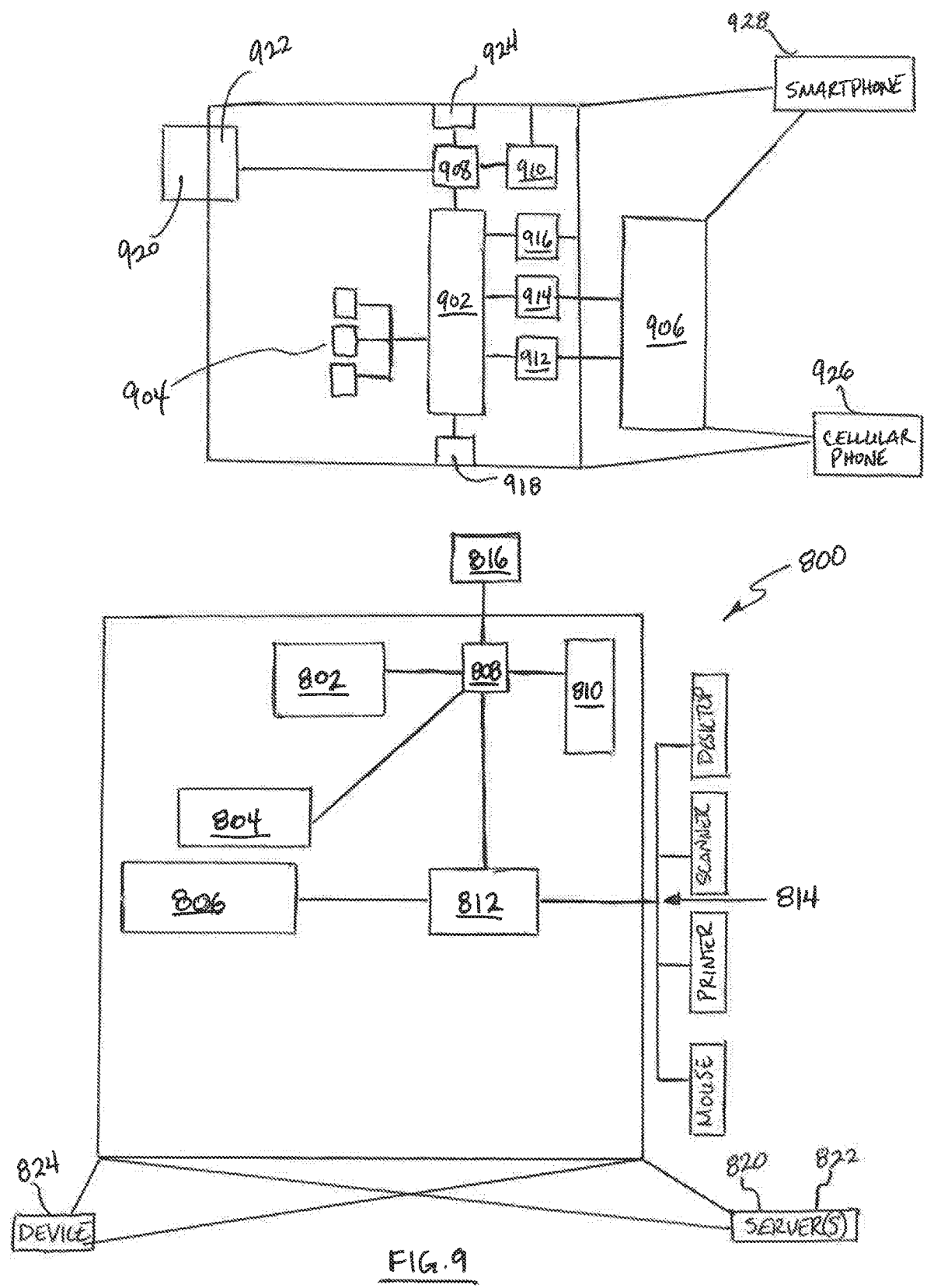
FIG. 9 generally represents example devices through which implementation of the described embodiments may be achieved.

For example, FIG. 9 discloses and represents the implementation of the aforementioned embodiment(s) and/or combination of embodiments, whereby the method, system, and operation of the application is embodied in the form of digital electronic circuitry, hardware, firmware, software, and/or in combinations of these tangible devices. of a generic computer device 800 and a generic mobile computer device 900. The device 800 may include various forms of digital computers, including desktops, workstations, laptops, various forms of servers, mainframes, and other similar devices. The device 900 may include various forms of mobile devices or electronics, including cellular telephones, smartphones, various mobile devices, personal digital assistant devices, and other similar devices or electronics. The devices 800 and 900 may be used to implement the methods, systems, and operations or processes described herewith, including on both the mobile-side and server-side for installing a computer program from computer to a mobile device or similarly to a mobile device from a computer. The tangible elements or components depicted along with the interconnections and interrelationships, including functions, are only intended to be exemplary and are not intended to impose a limit on the implementations of the embodiments described and/or claimed herein.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The components 802-812 are interconnected using various busses and may be mounted on a common printed circuit board or logic board, or in another manner as may be more suitable.

The processor 802 processes executable instructions that are carried out within the device 800. These executable instructions may include instructions stored in memory 804 or on storage device 806 that may then be displayed via a GUI on a dedicated display 816 that may be coupled to high speed interface 808. It is envisioned that multiple processors and/or multiple busses may be utilized with multiple types of memory. It is also envisioned that multiple devices 800 may be interconnected so that each device provides a portion of the necessary operations (e.g., as a server bank).

Memory 804 stores information within device 800. In one embodiment, memory 804 is a volatile memory unit or multiple volatile memory units, such dynamic random access memory (DRAM) and static random access memory (SRAM). In another embodiment, the memory 804 is a non-volatile memory unit or multiple non-volatile memory units. Memory 804 may also comprise another form of computer-readable medium, such as a fixed or removable magnetic or optical disk. As noted above, memory 804 may include a variety of separate or combined forms, including but not limited to all forms of non-volatile memory, including by way of example semiconductor memory devices, for example, EPROM, EEPROM, and flash memory devices; magnetic disks, for example, internal hard disks or removable disks; magneto-optical disks; and CD-ROM and DVD-ROM disks.

The storage device 806 is capable of providing mass storage for the computing device 800. In one embodiment, the storage device 806 may be or contain a computer-readable medium, including any of the persistent and/or solid-state memory devices listed above, and/or an array of devices, including devices in a storage area network. A computer program product can be tangibly embodied in a data object or database. The computer program product may also contain executable instructions that perform one or more methods or operations, or perform one or more methods or operations within a system, such as those described above. The data object may be a non-transitory computer- or machine-readable storage medium, such as memory 804, the storage device 806, or memory on processor 802.

In one example, data transfer is managed and controlled in part by interfaces 808 and 812. The high speed interface 808 manages bandwidth-intensive operations for device 800, while the low speed interface 812 manages lower bandwidth-intensive operations. The interface 808 is coupled to memory 804, display 816, and to high-speed expansion ports 810, which may accept expansion units. In the embodiment, low-speed interface 812 is coupled to storage device 806 and low-speed expansion port 814. The expansion port 814, which may include various types or forms of communication ports (such as Bluetooth, Ethernet, wireless Ethernet, and USB formats), may be coupled to one or more input/output devices, such as a keyboard, a mouse or touchpad, a scanner, or a networking device such as a switch or router.

Device 800 may be embodied in a number of different forms or types, including as a rack server, 820, a standard server 822, and/or a laptop computer 824. In addition, components from device 800 may be combined with other components in a mobile device 900 (and as described in greater detail below). It is envisioned that each device may include one or more of devices 800 and/or 900. It is further envisioned that an entire system may comprise or include multiple computing devices 800 and/or 900 interoperable and communicating with one another.

Device 900 includes a processor 902, memory 904, an input/output device in the form of a graphic display 906, a communication interface 908, and a transceiver 910. Device 900 may also include a storage device. Each of the elements 900-910 are interconnected using various busses and may be mounted on a common printed circuit board or logic board, or in another manner as may be more suitable.

Processor 902 can execute instructions within the computing device 900, including executable instructions stored in the memory 904. Processor 902 may be embodied as a chipset of chips that include separate and multiple analog and digital processors. Processor 902 may provide for coordination of the other components of the device 900, such as controlling user interfaces, the applications or operations ran by device 900, and the wireless communication of device 900.

Processor 902 may communicate with a user through control interface 908 and display interface 912 coupled to a display 906. The display interface 912 may comprise appropriate circuitry for driving the display 906 to present graphical and other information. The control interface 914 receives commands from a user and converts the commands for submission to the processor 902. In addition, an external interface 918 may be provided in communication with processor 902 enabling a near-area communication of device 900 with other devices. External interface 918 may also allow for wired and/or wireless communication, including the utilization of multiple interfaces.

Memory 904 stores information within the computing device 900. Memory 904 can be embodied as one or more of a computer-readable medium or media, a volatile memory unit or units, or a non-volatile memory unit or units. Expansion memory 920 may be included and connected to device 900 via an expansion interface 922. The expansion interface 922 may include a SIMM (Single In Line Memory Module) card interface as but one example. Expansion memory 920 may provide extra storage space for device 900, or may also store applications or other information for device 900. In addition, expansion memory 920 may include instructions to execute or supplement execution of instructions and/or processes described above, and may also include secure information. Expansion memory 920 may serve as a security module for device 900, and may be programmed with executable instructions that permit secure use of device 900 through installed or programmed security protocols. Moreover, secure applications may be provided via the SIMM cards, such as installing identifying information on the SIMM card in a manner that may not be compromised or hacked.

Memory 904 may include flash memory and/or nonvolatile random access memory. In one embodiment, a computer program product is tangibly embodied in a data object. The computer program product may also contain executable instructions that perform one or more methods or operations, or perform one or more methods or operations within a system, such as those described above. The data object is a computer- or machine-readable medium, such as the memory 904, expansion memory 920, memory on processor 902, or a propagated signal that may be received via a transceiver 910 or external interface 918.

Device 900 may communicate wirelessly through communication interface 908. Communication interface 908 may provide for communications under various protocols, such as SMS, MMS messaging, GSM voice calls, EMS, CDMA, WCDMA, TDMA, PDC, GPRS, and/or CDMA2000, among several other protocols available. Such communication may occur through radio-frequency transceiver 910. In addition, short-range communication may occur, such as using a wi-fi, Bluetooth, or another transceiver. In addition, GPS (Global Positioning System) receiver module 924 may provide additional navigation and/or location-related wireless data to device 900.

Device 900 may also communicate audibly using audio codec 916. Audio codec 916 may likewise generate audible sound for a user through a speaker and/or in a handset of device 900. Such sound may include sound from voice telephone calls, recorded sound, and/or sound generated by applications operating on device 900.

Device 900 may be embodied by a number of different forms, including as a cellular telephone 926 and/or a smartphone 928, or other similar mobile device.

These computer programs (also known as programs, software, software applications or code) include machine instructions for a programmable processor, and can be implemented in a high-level procedural and/or object-oriented programming language, and/or in assembly/machine language.

To provide for interaction with a user, the systems and techniques described here can be implemented on a computer having a display device for displaying information to the user and a keyboard and a pointing device by which the user can provide input to the computer. Other kinds of devices can be used to provide for interaction with a user as well; and input from the user can be received in any form, including acoustic, speech, or tactile input.

The systems and techniques described here may be embodied in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It is to be understood that the embodiments and claims are not limited in application to the details of construction and arrangement of the components set forth in the description and/or illustrated in drawings. Rather, the description and/or the drawings provide examples of the embodiments envisioned, but the claims are not limited to any particular embodiment or a preferred embodiment disclosed and/or identified in the specification. Any drawing figures that may be provided are for illustrative purposes only, and merely provide practical examples of the invention disclosed herein. Therefore, any drawing figures provided should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations.

Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

What I claim is:

1. One or more tangible, non-transitory computer-readable media having computer-executable instructions embodied thereon that, when executed by a computing device having a processor and memory, perform a method comprising:
   providing a graphic user interface allowing one or more users to input user attributes, the graphic user interface enabling bilateral communication between at least one buyer and at least one merchant;
   inputting of one or more buyer profile attributes;
   selecting one or more types of merchant the one or more buyers prefers to interact;
   inputting of one or more merchant profile attributes;
   selecting one or more types of buyer that the one or more merchants prefers to interact;
   inputting parameters in a free-form manner to replicate meta-data;
   creating multiple user profiles through an interoperable on-line system receiving inputs from the one or more buyer profile attributes and from the one or more merchant profile attributes;

transmitting the one or more buyer attributes and the one or more merchant attributes into one or more databases for storage and retrieval;

notifying one or more merchants when request parameters of one or more buyers is satisfied by one or more merchants;

proposing or rejecting one or more offers to interact with one or more buyers by one or more merchants, wherein the computing device presents a notification of proposing one or more offers or rejecting one or more offers whereby the notification functions to inform the buyer(s) of the proposed or rejected offer or offers;

accepting or rejecting terms proposed by one or more merchants by one or more buyers based on one or more buyers responding to the terms proposed; and, storing user statistics on one or more databases, data transfer between databases by a high speed interface and a low speed interface, the high speed interface managing large capacity data operations and the low speed interface managing low capacity data operations, wherein the stored user statistics are analyzed to produce tailored subsequent solicitations to a specified buyer or buyers based on analysis of the stored buyer statistics, the tailored subsequent solicitations for a subscribing buyer base to consider, the tailored subsequent solicitations to the subscribing buyer base including offers regarding products and/or services that are customized based on product/service availability restrictions, the tailored subsequent solicitations improving the precision of merchant-to-subscribing buyer base solicitation that optimizes transactions and reduces inventory surplusage;

specifying one or more parameters during input of the one or more merchant profile attributes, the parameters defining the expiration of the solicitation;

selecting a group fund option formed from a consumer pool; and, specifying the one or more individuals to be included in a contributing pool and the one or more individuals to be included in a receiving pool, and specifying a total spending limit on the contributing pool and an individual limit within the contributing pool.

2. The method of claim 1, wherein the one or more databases comprises at least one buyer database.

3. The method of claim 1, wherein the one or more databases comprises at least one merchant database.

4. The method of claim 1 further comprising providing an on-line transaction finalization interface to complete a solicitation with acceptance or rejection of the offered solicitation.

5. The method of claim 1 comprises further selecting one or more specific merchants the one or more buyers prefer to interact.

6. The method of claim 1 comprising further selecting one or more specific buyers the one or more merchants prefer to interact.

7. The method of claim 1 comprising further specifying the one or more parameters as a defined deadline for responding to the solicitation.

8. The method of claim 1 comprising further specifying the one or more parameters as a defined budgetary range.

9. The method of claim 1 comprising further specifying the one or more parameters as specified keywords in responding to user keyword inputs.

* * * * *